US009272580B2

(12) United States Patent
Kleffmann et al.

(10) Patent No.: US 9,272,580 B2
(45) Date of Patent: Mar. 1, 2016

(54) PNEUMATIC VEHICLE TYRE FOR UTILITY VEHICLES

(75) Inventors: Jens Kleffmann, Hannover (DE); Pedro-Soares Marques, Turin (IT)

(73) Assignee: CONTINENTAL REIFEN DEUTSCHLAND GMBH, Hannover (DE)

( * ) Notice: Subject to any disclaimer, the term of this patent is extended or adjusted under 35 U.S.C. 154(b) by 713 days.

(21) Appl. No.: 13/641,326

(22) PCT Filed: Feb. 14, 2011

(86) PCT No.: PCT/EP2011/052096

§ 371 (c)(1),
(2), (4) Date: Dec. 26, 2012

(87) PCT Pub. No.: WO2011/128126

PCT Pub. Date: Oct. 20, 2011

(65) Prior Publication Data

US 2013/0092303 A1 Apr. 18, 2013

(30) Foreign Application Priority Data

Apr. 16, 2010 (DE) ........................ 10 2010 016 469

(51) Int. Cl.
*B60C 11/03* (2006.01)
*B60C 11/04* (2006.01)
*B60C 9/20* (2006.01)

(52) U.S. Cl.
CPC ............... *B60C 11/04* (2013.01); *B60C 11/033* (2013.04); *B60C 9/2006* (2013.04); *B60C 2011/0341* (2013.04); *B60C 2011/0346* (2013.04); *B60C 2011/0353* (2013.04); *B60C 2011/0355* (2013.04); *B60C 2200/06* (2013.04)

(58) Field of Classification Search
CPC .................. B60C 11/1307; B60C 2011/0353; B60C 2011/0386; B60C 11/042; B60C 2011/0388; B60C 2011/039; B60C 2011/0341; B60C 11/03; B60C 11/04; B60C 11/033; B60C 11/0332; B60C 2011/0344; B60C 2011/0346; B60C 2011/0348; B60C 2011/0355; B60C 2200/06
USPC .............. 152/209.9, 209.18, 209.26, 209.27, 152/900, 901
See application file for complete search history.

(56) References Cited

U.S. PATENT DOCUMENTS 3,254,693 A 6/1966 Travers
5,535,798 A * 7/1996 Nakamura ............... 152/209.21
5,837,074 A * 11/1998 Uemura .................. 152/209.18
6,415,834 B1 7/2002 Carra et al.
6,443,199 B1 * 9/2002 Scarpitti et al. ............ 152/209.1

FOREIGN PATENT DOCUMENTS

EP 0 973 652 1/2000
JP 60 082407 5/1985
JP 2009 143301 7/2009

* cited by examiner

*Primary Examiner* — Eric Hug
(74) *Attorney, Agent, or Firm* — Greenblum & Bernstein, P.L.C.

(57) ABSTRACT

The invention relates to a pneumatic vehicle tire for utility vehicles having a belt which has a plurality of belt layers and having a tread (1) with circumferential grooves (6, 7, 8) which run in the circumferential direction and divide the tread (1) into circumferential ribs (2). An envelope h which runs parallel to the periphery of the tread in the tread (1) and is in contact with the deepest circumferential groove or grooves from the radially inner side, defines, together with the periphery of the tread and the shoulder-side edge sections (5), a tread gross volume (V), wherein all the grooves (6,7,8) in the tread (1) define a groove volume ($V_R$) between 5% and 28% of the tread gross volume (V), wherein three circumferential grooves (6,7,8) are provided which are arranged over the axial width of the tread (1) in such a way that the first circumferential groove (6) is arranged in the region of the one edge (10) of the widest belt layer, the second circumferential groove (7) is arranged in the region of the other edge (11) of the widest belt layer of the belt, and the third circumferential groove (8) is arranged between the first circumferential groove (6) and the second circumferential groove (7) in the tread (1), and wherein the first and second circumferential grooves (6, 7) each have a groove volume ($V_{R1,2}$) between 1.25% and 7.00% of the tread gross volume (V), and the third circumferential groove (8) has a groove volume ($V_{R3}$) of the first or of the second circumferential groove which is at least twice as large.

20 Claims, 1 Drawing Sheet

PNEUMATIC VEHICLE TYRE FOR UTILITY VEHICLES

CROSS-REFERENCE TO RELATED APPLICATIONS

The present application is a U.S. National Stage of International Patent Application No. PCT/EP2011/052096 filed Feb. 14, 2011, and claims priority under 35 U.S.C. §§119(a) and 365 of German Patent Application No. 10 2010 016 469 filed Apr. 16, 2010.

BACKGROUND OF THE INVENTION

1. Field of the Invention

The invention relates to a pneumatic vehicle tire for utility vehicles having a tread comprising circumferential grooves that run in the circumferential direction and divide the tread into circumferential ribs. An envelope that runs in parallel with the tread periphery in the tread and is in contact with the deepest circumferential groove or grooves from radially inside defines, together with the tread periphery and the shoulder-side edge sections, a tread gross volume and all the grooves in the tread define a groove volume.

2. Discussion of Background Information

A tire of the type mentioned in the introduction is known by way of example from U.S. Pat. No. 5,535,798 B. In order to achieve uniform tread wear, the tread is divided into circumferential ribs by four wide circumferential grooves that run in the circumferential direction. An additional narrow circumferential groove that runs in the circumferential direction is provided in the two shoulder-side circumferential ribs in the proximity of the edges of the tread. The wide circumferential grooves are defined by groove edge surfaces that are provided with depressions in the form of negative three-sided pyramids, whose peaks face the tread periphery.

In order to reduce the roll resistance of pneumatic vehicle tires, a plurality of measures have already been proposed, by way of example, a reduction of the profile depth or a reduction in the width of the tread. These measures are aimed at reducing the volume of rubber that deforms during the rolling motion. In addition, special tread compounds reduce the roll resistance, for example, tread compounds that comprise a comparatively small proportion of filler material.

A plurality of published patent applications and patents is concerned with the subject of reducing the roll resistance of utility vehicle tires in order to reduce the fuel consumption of a vehicle. It follows from this, that a tire for truck driving wheels is known, by way of example, from EP 0 973 652 B1. The tire comprises a tread that is divided into blocks in order to reduce the roll resistance and which blocks are laced in an axial manner by slots. In addition, the blocks are mutually separated by transverse grooves that are provided in each case with additional slots. In addition, a plurality of longitudinal slots is provided.

In the hitherto unpublished European patent application 09169199.8 of the assignee of the pending application, it is proposed in order to reduce the roll resistance to reduce the groove volume in the tread in favor of increasing the volume of rubber in the tread. The groove volume is reduced, by way of example, by virtue of the arrangement of narrower circumferential grooves or a comparatively smaller number of circumferential grooves. Contrary to the hitherto opinion of the scientific world, surprisingly it has been demonstrated that an increase in the volume of rubber in the tread noticeably reduces the roll resistance. It has been demonstrated that in the case of a comparatively small groove volume the rigidity of the profile in the radial direction is increased to such an extent that the deformation amplitude of the tread is reduced in a scale of magnitude that effects an over-compensation of the anticipated effect—an impairment of the roll resistance as a result of there being more available rubber. The roll resistance of the tire is consequently reduced. The reduction in the roll resistance that can be achieved in comparison to a tire embodied according to the prior art can be significant depending upon the proportion of the groove volume.

The length and the width of the ground-contacting surface area of the tire are only insignificantly changed by virtue of this aforementioned measure that improves roll resistance. The contact surface area between the tires and the road is increased in the case of a reduced groove volume but with an almost identical ground-contacting surface area. Consequently, the radial surface pressure in the ground-contacting surface area is reduced per unit of area. However, a high radial surface pressure is desired in the ground-contacting surface area in order, by way of example, to achieve a good tire handling in the case of different road surface conditions. When using a profile-based optimization of the roll resistance by reducing the groove volume, a conflict of aims can occur with regard to the tire handling.

SUMMARY OF THE EMBODIMENTS

Embodiments of the invention reduce the roll resistance of a utility vehicle tire in an effective manner by virtue of profile-based measures without having negative effects on other tread characteristics, such as the tire handling, wear and life-expectancy of the tire.

According to embodiments, all the grooves in the tread define a groove volume between 5% and 28% of the tread gross volume. Three circumferential grooves are arranged in such a manner over the axial width of the tread that the first circumferential groove is arranged in the region of one edge of the widest belt layer, the second circumferential groove is arranged in the region of the other edge of the widest belt layer of the belt and the third circumferential groove is arranged between the first circumferential groove and the second circumferential groove, preferably centrally in the tread. The first and the second circumferential groove each comprise a groove volume between 1.25% and 7.00% of the tread gross volume and the third circumferential groove comprises a groove volume that is at least twice as large as that of the first or the second circumferential groove.

"First and/or second circumferential groove in the region of an edge of the widest belt layer" means an axially-extending region in the tread, in which region the first and/or the second circumferential groove is arranged completely or at least partially. The axially-extending region commences at the edge of the widest belt layer (projected in the radial direction), which edge is in the closest proximity to the circumferential groove, and said region extends in the axial direction towards the tread middle at a maximum 100 mm therefrom.

In the case of the invention, the knowledge to reduce the roll resistance by increasing the volume of rubber in the tread is combined with the surprising knowledge that the roll resistance can likewise be reduced by virtue of a reduced number of circumferential grooves, which is automatically associated with a reduced number of free groove edges and in addition by circumferential grooves that are embodied or formed in a non-uniform wide manner and distributed in a particular manner.

It has been established that in the case of a groove volume of up to 28% of the gross volume, the profile rigidity is increased in the radial direction in such a manner that the deformation amplitude of the tread is reduced in a scale of magnitude which effects an overcompensation of the anticipated effect, i.e., an impairment of the roll resistance as a result of there being more available rubber. The combination of a comparatively small groove volume in the case of a correspondingly increased volume of rubber with a reduced number of non-uniformly wide circumferential grooves and thus a reduction in the number of freely movable groove edges in the aforementioned arrangement and embodiment of the circumferential grooves has been established as being of particular advantage in order to reduce the roll resistance yet still maintaining good handling characteristics for different road surface conditions.

In addition to the three circumferential grooves, any number of additional grooves can be provided in the circumferential direction. The groove volume of the additional grooves is in each case smaller than 1.25%. These additional grooves in the circumferential grooves are referred to in this application as "additional circumferential grooves". Likewise or as an alternative, any number of transverse grooves and any width of transverse grooves can be arranged in the tread.

Since the proportion of the groove volume influences the achievable reduction of the roll resistance and the handling characteristics of the tire, it has been established that it is of advantage if the proportion of the groove volume of the gross volume amounts to between 10% and 20%, particularly of advantage between 13% and 15%. It is ensured in the case of the groove volume described here that a sufficiently high radial surface pressure between the tires and the road surface is achieved in the ground-contacting surface area, which ensures the handling characteristics for different road surface conditions.

Since the arrangement and embodiment of the three circumferential grooves influence the achievable reduction of the roll resistance and the handling characteristics of the tire, it has been established that it is of advantage if the third (central) circumferential groove comprises at the tread periphery at least three-times the groove volume, preferably four-times and particularly preferred five-times the groove volume of the first (or the second) circumferential groove.

The life-expectancy of the tire is particularly high if the groove depth of a circumferential groove, preferably each circumferential groove, amounts to between 10 mm and 25 mm, wherein the depth of all the circumferential grooves can be identical or also different.

It is of advantage if at least one circumferential groove comprises a zigzag geometry with amplitudes that are deflected in the axial direction, which further improves the handling characteristics.

It is of advantage if the tread comprises groove-like cutouts that are arranged axially inside and axially outside and run around the circumference in such a manner that the axial width of the ground-contacting surface area is reduced.

Treads in accordance with the invention can comprise in the circumferential grooves: transverse grooves, notches and the like, whose "air volume" corresponds to the groove volume.

Embodiments of the invention are directed to a pneumatic vehicle tire for utility vehicles that include a belt having a plurality of belt layers and a tread having three circumferential grooves running in a circumferential direction and dividing the tread into circumferential ribs. A volume between a tread periphery and an imaginary boundary that extends radially below and parallel to the tread periphery and that is in contact with a deepest of the circumferential grooves is a tread gross volume, within which all of the circumferential grooves define a groove volume between 5% and 28% of the tread gross volume. The three circumferential grooves are arranged over an axial width of the tread so that a first circumferential groove is arranged in a region of an axial edge of a widest belt layer of the belt, a second circumferential groove is arranged in a region of an other axial edge of the widest belt layer of the belt and a third circumferential groove is arranged between the first circumferential groove and the second circumferential groove. Each of the first and the second circumferential grooves includes a groove volume between 1.25% and 7.00% of the tread gross volume and the third circumferential groove includes a groove volume that is at least twice as large as the first or the second circumferential groove.

According to embodiments, a proportion of the groove volume to the gross volume can be between 10% and 20%. Further, a proportion of the groove volume to the gross volume may be between 13% and 15%.

In accordance with other embodiments of the invention, the third circumferential groove can include a groove volume that is at least three-times the groove volume of the first circumferential groove. Moreover, the third circumferential groove may include a groove volume that is at least four-times the groove volume of the first circumferential groove. Still further, the third circumferential groove may include a groove volume that is at least five-times the groove volume of the first circumferential groove.

According to still other embodiments, a groove depth of at least one of the three circumferential grooves can be between 10 mm and 25 mm. Further, the groove depth of each of the three circumferential grooves can be between 10 mm and 25 mm. Moreover, the depth of the each of the three circumferential grooves can be uniform. Still further, the depth of at least one of the three circumferential grooves may be different from at least one of the other circumferential grooves.

In further embodiments, at least one of the three circumferential grooves can include a zigzag geometry with amplitudes deflected in an axial direction.

Moreover, on each axial end of the tread, a groove-like cut-out can runs around the circumference to reduce a ground-contacting surface area in an axial direction.

In other embodiments, at least one of the three circumferential grooves may include groove edges having protruding design elements. The the protruding design elements can include at least one of elevations and inclined surfaces.

According to further embodiments of the invention, the volume defining the groove volume may include shoulder side edge sections.

Embodiments of the invention are directed to a pneumatic vehicle tire for utility vehicles. The pneumatic tire includes a tread having three circumferential grooves running in a circumferential direction to divide the tread into four circumferential ribs, and a plurality of belt layers arranged below the tread. A tread gross volume includes a rubber volume and groove volumes for each of the circumferential grooves, such that each of a first and a second of the three circumferential grooves include a groove volume between 1.25% and 7.00% of the tread gross volume and a third of the three circumferential grooves, which is arranged between the first and second circumferential grooves, includes a groove volume that is at least twice that of the first or the second circumferential groove.

According to embodiments, the first circumferential groove can be arranged in a region of a first axial edge of a widest belt layer and the second circumferential groove can be arranged in a region of a second axial edge of the widest belt layer.

In accordance with other embodiments of the invention, the tread gross volume may be defined between a tread periphery and an imaginary boundary that extends radially below and parallel to the tread periphery and that is in contact with a bottom of a deepest of the three circumferential grooves.

According to still other embodiments, the tread periphery can include shoulder side edge sections.

In accordance with still yet other embodiments of the present invention, a combined groove volume for the three circumferential grooves may be between 5% and 28% of the tread gross volume.

BRIEF DESCRIPTION OF THE DRAWINGS

Further features, advantages and details of the invention are now described in detail with reference to the drawings that illustrate schematic exemplary embodiments, in which.

DETAILED DESCRIPTION OF THE EMBODIMENTS

The invention relates to a particular embodiment of tread for utility vehicle tires, in particular truck, bus and trailer tires. Tires embodied in accordance with the invention are preferably designed for use on the steering axle of relevant vehicles and can comprise the conventional construction of radial pneumatic tires for these application purposes. The construction is therefore neither illustrated nor described.

Figure 1:
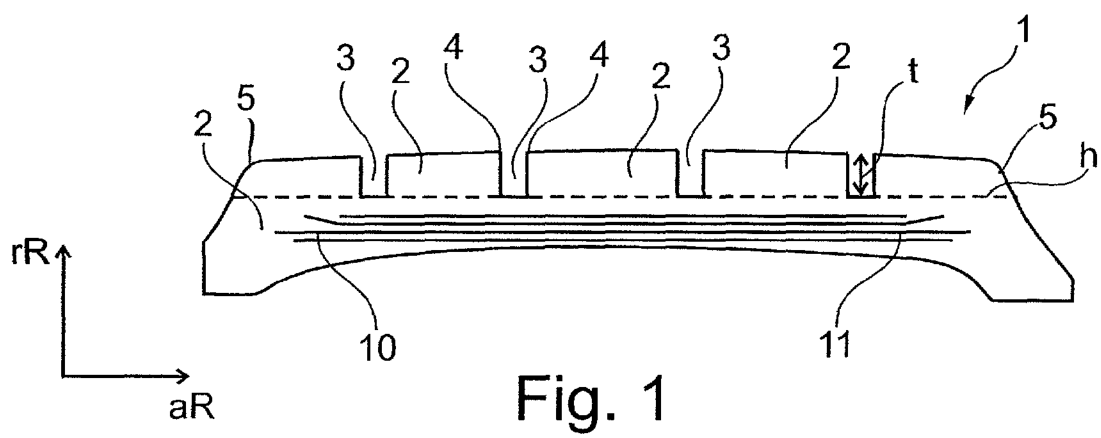
FIG. 1 shows a cross-sectional view through an embodiment of the tread of a reference tire.

FIG. 1 illustrates an embodiment of a tread 1 of a reference tire (cf. following table) having five circumferential ribs 2 that run in the circumferential direction of the tread and are of a substantially mutually-corresponding width. This reference tire is not embodied or formed in accordance with the invention. The circumferential ribs 2 are mutually separated by four wide circumferential grooves 3 that run in the circumferential direction and are all embodied in the illustrated embodiment in each case in a manner corresponding to a groove volume of 3.5%. The groove volume $V_R$ amounts in total to 14% of the tread gross volume V. The maximum depth t of the wide circumferential grooves 3 amounts to 15 mm, which maximum depth in the case of the illustrated reference embodiment is selected to be of equal size for all the circumferential grooves 3. A reference line h is plotted in FIG. 1 in parallel with the axial outer contour of the tread periphery. Reference line h contacts the wide circumferential grooves 3 on their radially inner ends and represents in this manner in the cross-sectional view an envelope that runs in parallel with the tread periphery in the circumferential direction within the tread 1.

The envelope represented by the reference line h, the tread periphery and the shoulder-side edge sections 5 of the tread 1 encompass a gross volume V that is the total of the volume of rubber available here and the groove volume $V_R$. Groove volume $V_R$ for its part is the total of the “air volume” of all the wide circumferential grooves 3—determined between the groove boundaries and an the envelope of the tread periphery.

Figure 2:
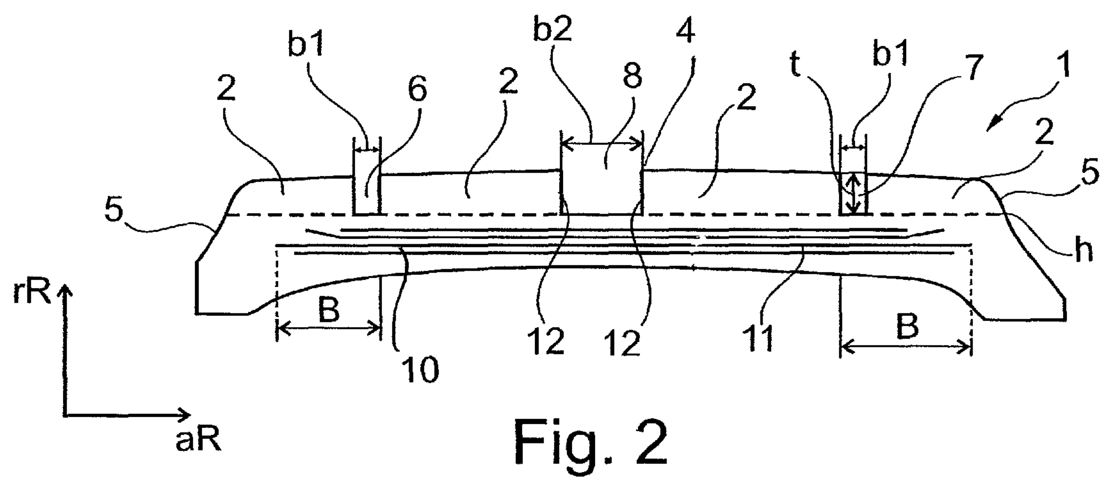
FIG. 2 shows a cross-sectional view through an embodiment of the tread of a utility vehicle tire embodied in accordance with the invention.

FIG. 2 illustrates a cross-sectional view through an embodiment of the tread 1 of a utility vehicle tire embodied or formed in accordance with the invention (cf. the following table “Tire 1”). The tread 1 comprises four circumferential ribs 2 that run in the circumferential direction of the tread and have different axial widths. The circumferential ribs 2 are mutually separated by three circumferential grooves 6, 7, 8 that run in the circumferential direction and have different widths $b_1$, $b_2$. The first circumferential groove 6 is arranged in the region B of one belt edge 10, the second circumferential groove 7 is arranged in the region B of the other belt edge 11 and the third circumferential groove 8 is arranged centrally in the tread 1. The circumferential grooves 6, 7, 8 comprise on the tread periphery boundary edges 4 that run in the circumferential direction in a straight line and in a mutually parallel manner. The first and the second circumferential groove 6, 7 encompass a groove volume ($V_{R1,2}$) of 1.75% in each case in relation to the tread gross volume (V). The third circumferential groove encompasses a groove volume ($V_{R3}$) of 10.5% in relation to the tread gross volume (V). The maximum depth t—as seen in the radial direction—of the circumferential grooves 6, 7, 8 amounts to between 10 mm and 25 mm, in this case 15 mm. The maximum depth in the case of the illustrated embodiment is selected to be of equal size for all the circumferential grooves. In an analogous manner to FIG. 1, a reference line h is plotted in parallel with the axial outer contour of the tread periphery and reference line h contacts the circumferential grooves 6, 7, 8 on their radially inner ends to represent in the cross-sectional view an envelope that runs in parallel with the tread periphery in the circumferential direction within the tread 1.

The envelope that is represented by the reference line h, the tread periphery and the shoulder-side edge sections 5 of the tread 1 encompass a gross volume V that is the total of the volume of rubber available here and the groove volume $V_R$, which groove volume $V_R$ for its part is the total of the “air volume” of all the circumferential grooves 6, 7, 8—determined between the groove boundaries and an envelope of the tread periphery. In the case of the tire embodied in accordance with the invention, the proportion of the groove volume $V_R$ with respect to the gross volume V amounts to 14%. Only six groove edges are embodied by virtue of the comparatively small number of only three circumferential grooves 6, 7, 8 that have different widths.

Figure 3:
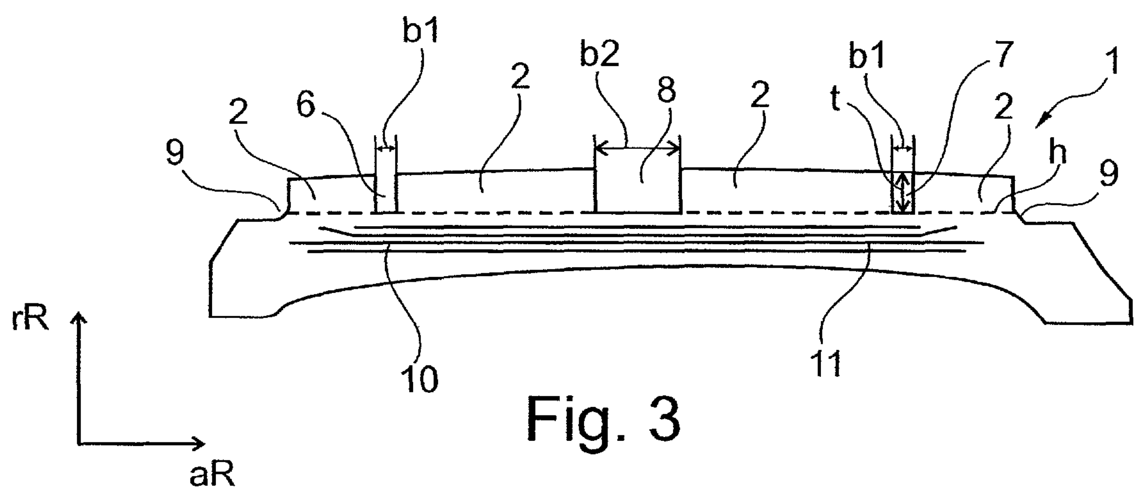
FIG. 3 shows a cross-sectional view through another embodiment of the tread of a utility vehicle tire embodied in accordance with the invention.

FIG. 3 illustrates a cross-sectional view through another embodiment of the tread of a utility vehicle tire embodied or formed in accordance with the invention. The tread is constructed in a similar manner to the tread illustrated in FIG. 2, however, the utility vehicle tire shown in FIG. 3 comprises in addition axially inside and axially outside groove-like cutouts 9 that run around the circumference in the tread 1, which cut-outs are embodied or formed in such a manner that the axial width of the ground-contacting surface area is reduced.

The following table illustrates roll resistances of a reference tire and of two tires embodied in accordance with the invention, tire 1 and tire 2.

TABLE

| | Profile Depth (in mm) | Groove Volume (in %) | No. of grooves | Volume of the circum-ferential grooves (in %) | Roll resistance (in %) in accordance with ISO 28580 |
|---|---|---|---|---|---|
| Reference Tire | 15 | 14 | 4 | Each 3.5 | 100 |
| Tire 1 | 15 | 14 | 3 | Third groove (central groove): 10.5 | 94 |

TABLE-continued

| | Profile Depth (in mm) | Groove Volume (in %) | No. of grooves | Volume of the circum-ferential grooves (in %) | Roll resistance (in %) in accordance with ISO 28580 |
|---|---|---|---|---|---|
| Tire 2 | 15 | 14 | 3 | First and second groove (outer grooves): each 1.75 Third groove (central groove): 7.0 First and Second groove (outer grooves): each 3.5 | 98 |

The reference tire is the utility vehicle tire that is illustrated in FIG. 1 and described accordingly. The roll resistance of the reference tire amounts to 100%.

The tire 1 is the utility vehicle tire in accordance with the invention illustrated in FIG. 2 and described accordingly. The roll resistance of tire 1 is reduced in comparison to the roll resistance of the reference tire by 6%.

The tire 2 comprises a groove volume $V_R$ of 14% with respect to the gross volume V of the tread. The number of the circumferential grooves of the tread amounts to three, of which a circumferential groove is arranged respectively in the region of the edges of the widest belt layer and each circumferential groove has a volume $V_{R1,2}$ of 3.5%. The third circumferential groove is arranged in an axial manner centrally in the tread and comprises a volume of 7%. The roll resistance amounts to 98% and is consequently improved by 2% in comparison to the reference tire.

The term "circumferential groove" means circumferential grooves that comprise in each case a groove volume of at least 1.25%. The tread can comprise in accordance with the invention additional grooves as, for example, additional circumferential grooves with a groove volume of less than 1.25% or any number of transverse grooves and any width of transverse grooves.

LIST OF REFERENCE NUMERALS

1 Tread
2 Circumferential rib
3 Wide circumferential groove
4 Boundary edge
5 Edge section
6 First circumferential groove
7 Second circumferential groove
8 Third circumferential groove
9 Groove-like cut-out
10 A belt edge
11 The other belt edge
12 Groove edge
$b_{1\ Width}$
$b_{2\ Width}$
h Reference line
t Depth
B Region
V Gross volume
$V_R$ Groove volume
$V_{R1}$ Groove volume of the first circumferential groove
$V_{R2}$ Groove volume of the second circumferential groove
$V_{R3}$ Groove volume of the third circumferential groove

The invention claimed is:

1. A pneumatic reduced rolling resistance utility vehicle tire comprising:

a belt having a plurality of belt layers; and a tread having three circumferential grooves running in a circumferential direction and dividing the tread into circumferential ribs, wherein a volume between a tread periphery and an imaginary boundary that extends radially below and parallel to the tread periphery and that is in contact with a deepest of the circumferential grooves is a tread gross volume, within which all of the circumferential grooves define a groove volume between 5% and 28% of the tread gross volume, wherein the three circumferential grooves are arranged over an axial width of the tread so that a first circumferential groove is arranged in a region of an axial edge of a widest belt layer of the belt, a second circumferential groove is arranged in a region of an other axial edge of the widest belt layer of the belt and a third circumferential groove is arranged between the first circumferential groove and the second circumferential groove, wherein each of the first and the second circumferential grooves comprises a groove volume between 1.25% and 7.00% of the tread gross volume and the third circumferential groove comprises a groove volume that is at least twice as large as the first or the second circumferential groove, and wherein:

an axial distance between a center of the first circumferential groove and the axial edge of the widest belt layer of the belt is less than an axial distance between the center of the first circumferential groove and a center of the third circumferential groove; and an axial distance between a center of the second circumferential groove and the other axial edge of the widest belt layer of the belt is less than an axial distance between the center of the second circumferential groove and the center of the third circumferential groove.

2. The pneumatic vehicle tire as claimed in claim 1, wherein a proportion of the groove volume to the gross volume is between 10% and 20%.

3. The pneumatic vehicle tire as claimed in claim 1, wherein a proportion of the groove volume to the gross volume is between 13% and 15%.

4. The pneumatic vehicle tire as claimed in claim 1, wherein the third circumferential groove comprises a groove volume that is at least three-times the groove volume of the first circumferential groove.

5. The pneumatic vehicle tire as claimed in claim 1, wherein the third circumferential groove comprises a groove volume that is at least four-times the groove volume of the first circumferential groove.

6. The pneumatic vehicle tire as claimed in claim 1, wherein the third circumferential groove comprises a groove volume that is at least five-times the groove volume of the first circumferential groove.

7. The pneumatic vehicle tire as claimed in claim 1, wherein a groove depth of at least one of the three circumferential grooves is between 10 mm and 25 mm.

8. The pneumatic vehicle tire as claimed in claim 7, wherein the groove depth of each of the three circumferential grooves is between 10 mm and 25 mm.

9. The pneumatic vehicle tire as claimed in claim 7, wherein the groove depth of the each of the three circumferential grooves is uniform.

10. The pneumatic vehicle tire as claimed in claim 7, wherein the groove depth of at least one of the three circumferential grooves is different from at least one of the other circumferential grooves.

11. The pneumatic vehicle tire as claimed in claim 1, wherein at least one of the three circumferential grooves comprises a zigzag geometry with amplitudes deflected in an axial direction.

12. The pneumatic vehicle tire as claimed in claim 1, wherein, on each axial end of the tread, a groove-like cut-out runs around the circumference to reduce a ground-contacting surface area in an axial direction.

13. The pneumatic vehicle tire as claimed in claim 1, wherein at least one of the three circumferential grooves comprises groove edges having protruding design elements.

14. The pneumatic vehicle tire as claimed in claim 13, wherein the protruding design elements comprise at least one of elevations and inclined surfaces.

15. The pneumatic vehicle tire as claimed in claim 1, wherein the volume defining the groove volume includes shoulder side edge sections.

16. The pneumatic vehicle tire as claimed in claim 1, wherein:

the first and second circumferential grooves comprises a groove depth that is between 10 mm and 25 mm; and the third circumferential groove:

is a center circumferential groove of the tread;

comprises a groove volume that is at least twice the groove volume of the first and second circumferential grooves; and comprises a groove depth that is between 10 mm and 25 mm.

17. A pneumatic reduced rolling resistance utility vehicle tire comprising:

a tread having three circumferential grooves running in a circumferential direction to divide the tread into four circumferential ribs;

a plurality of belt layers arranged below the tread, wherein a tread gross volume comprises a rubber volume and groove volumes for each of the circumferential grooves, wherein each of a first and a second of the three circumferential grooves comprises a groove volume between 1.25% and 7.00% of the tread gross volume and a third of the three circumferential grooves, which is arranged between the first and second circumferential grooves, comprises a groove volume that is at least twice that of the first or the second circumferential groove, wherein:

an axial distance between a center of the first of the three circumferential grooves and an axial edge of a widest belt layer of the belt layers is less than an axial distance between the center of the first of the three circumferential grooves and a center of the third of the three circumferential grooves; and an axial distance between a center of the second of the three circumferential grooves and an other axial edge of a widest belt layer of the belt layers is less than an axial distance between the center of the second of the three circumferential grooves and the center of the third of the three circumferential grooves, and wherein a groove depth of at least the first and second of the three circumferential grooves is between 10 mm and 25 mm.

18. The pneumatic vehicle tire as claimed in claim 17, wherein the tread gross volume is defined between a tread periphery and an imaginary boundary that extends radially below and parallel to the tread periphery and that is in contact with a bottom of a deepest of the three circumferential grooves.

19. The pneumatic vehicle tire as claimed in claim 17, wherein the tread periphery includes shoulder side edge sections.

20. The pneumatic vehicle tire as claimed in claim 17, wherein a combined groove volume for the three circumferential grooves is between 5% and 28% of the tread gross volume.

* * * * *